United States Patent
Gollnick et al.

(10) Patent No.: US 11,920,563 B2
(45) Date of Patent: Mar. 5, 2024

(54) METHOD AND SYSTEM FOR CONTROLLING OPERATION OF WIND TURBINES

(71) Applicant: Siemens Gamesa Renewable Energy A/S, Brande (DK)

(72) Inventors: Bert Gollnick, Hamburg (DE); Vinay Kumar Manjunatha, Karnataka (IN)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/915,172

(22) PCT Filed: Mar. 3, 2021

(86) PCT No.: PCT/EP2021/055291
§ 371 (c)(1),
(2) Date: Sep. 28, 2022

(87) PCT Pub. No.: WO2021/197745
PCT Pub. Date: Oct. 7, 2021

(65) Prior Publication Data
US 2023/0120987 A1    Apr. 20, 2023

(30) Foreign Application Priority Data

Apr. 2, 2020 (EP) .................. 20167668

(51) Int. Cl.
*F03D 7/00* (2006.01)
*G08B 21/18* (2006.01)

(52) U.S. Cl.
CPC ............ *F03D 7/00* (2013.01); *G08B 21/182* (2013.01)

(58) Field of Classification Search
CPC ................ F03D 7/00; F03D 7/0264
See application file for complete search history.

(56) References Cited

U.S. PATENT DOCUMENTS

2017/0022977 A1    1/2017    Garcia

FOREIGN PATENT DOCUMENTS

| EP | 2192456 B1 | 6/2010 |
| EP | 2 375 059 A2 | 10/2011 |
| EP | 2541052 B1 | 4/2014 |

OTHER PUBLICATIONS

International Search Report & Written Opinion for PCT/EP2021/055291, dated Jun. 11, 2021.

(Continued)

*Primary Examiner* — Brian O Peters
(74) *Attorney, Agent, or Firm* — Schmeiser, Olsen & Watts, LLP

(57) ABSTRACT

A method and system of controlling operation of wind turbines is provided, the method including (a) receiving a parameter value which is based on at least one sensor signal, (b) determining a difference between the received parameter value and a predetermined value, (c) comparing the difference with a threshold value, and (d) if the difference is below the threshold value, operating the wind turbines in a first mode of operation, (e) if the difference is not below the threshold value, incrementing an alert counter, comparing the alert counter with an alert threshold value, operating the wind turbines in a second mode of operation if the alert counter is smaller than the alert threshold value or if the alert counter exceeds the second threshold value and the difference is decreasing, triggering an alarm if the alert counter exceeds the alert threshold value and the difference is not decreasing.

11 Claims, 3 Drawing Sheets

(56) References Cited

OTHER PUBLICATIONS

Bodil Anjar et al: "Feasibility study of thermal condition monitoring and condition based maintenance in wind turbines", Elforsk Rapport 11:19, May 31, 2011.

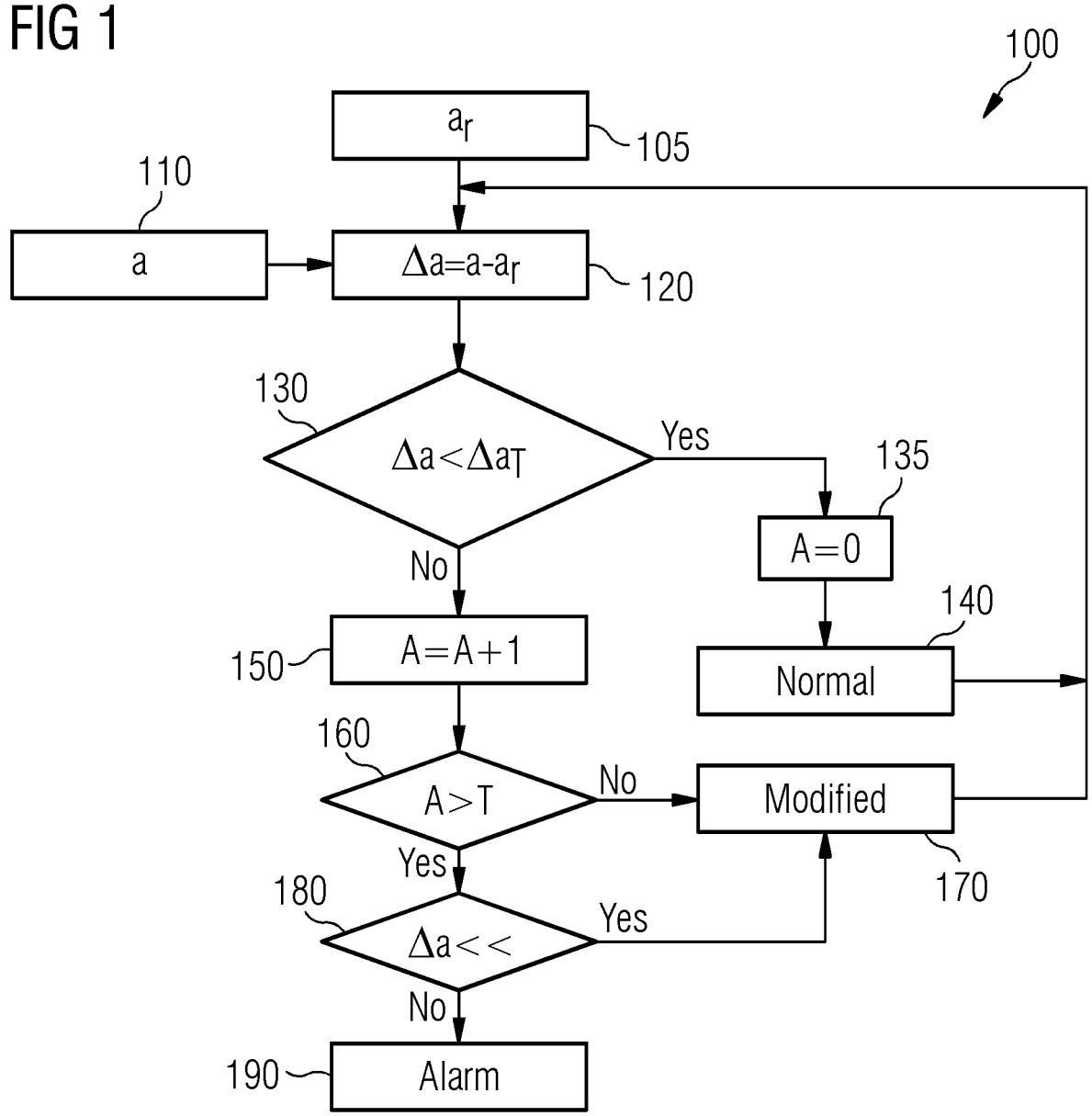

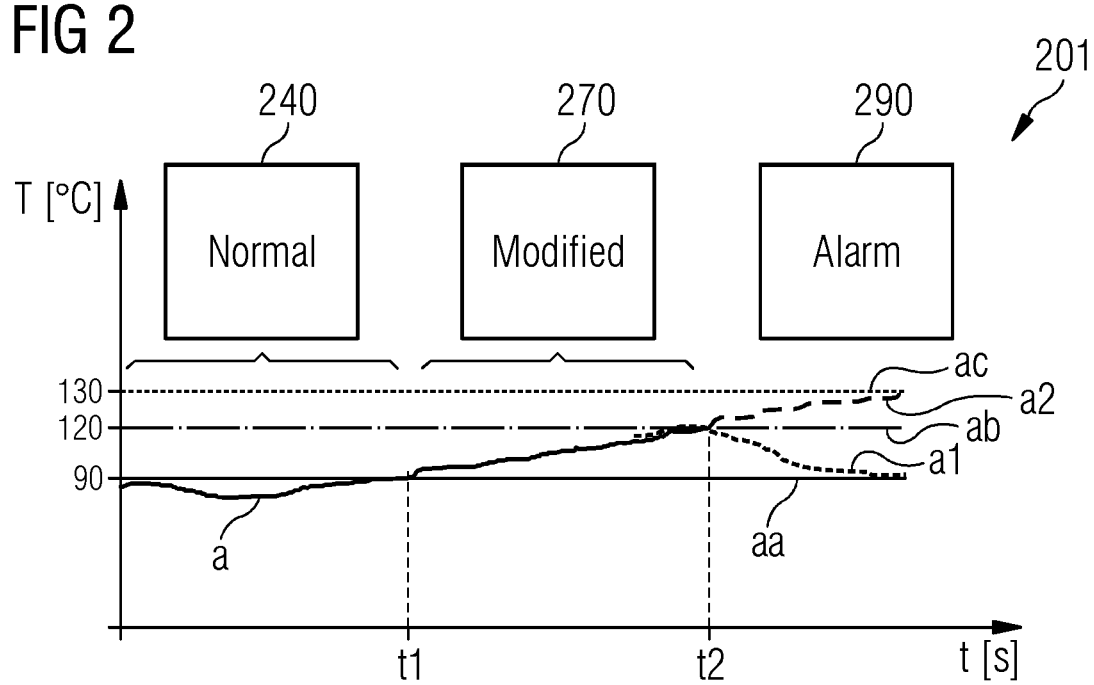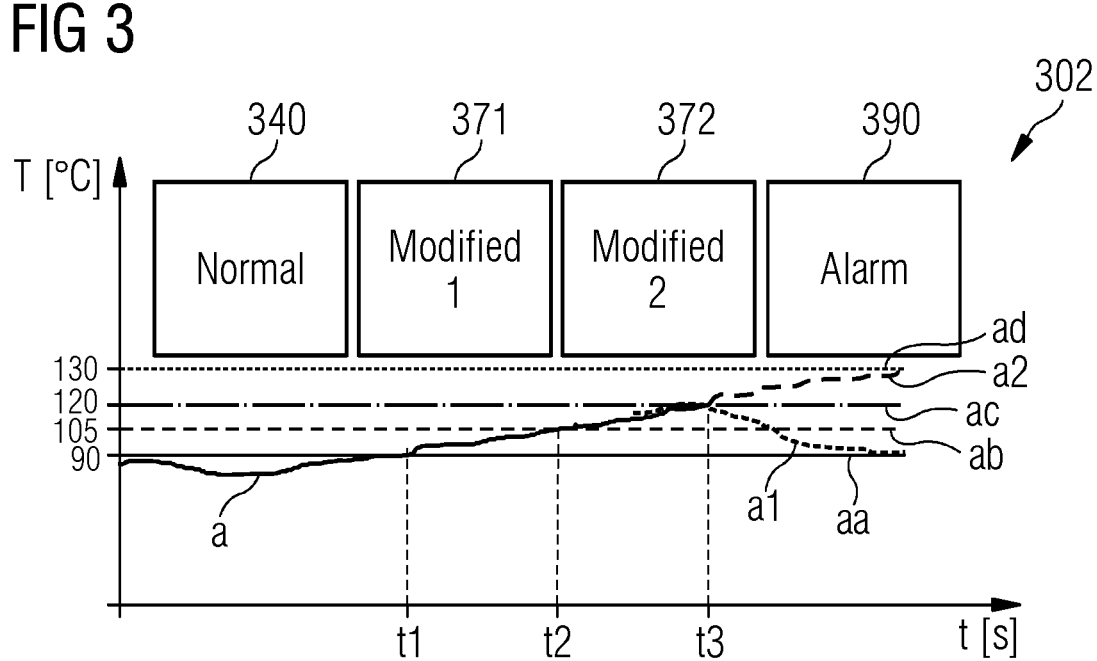

METHOD AND SYSTEM FOR CONTROLLING OPERATION OF WIND TURBINES

CROSS-REFERENCE TO RELATED APPLICATIONS

This application claims priority to PCT Application No. PCT/EP2021/055291, having a filing date of Mar. 3, 2021, which claims priority to EP Application No. 20167668.1, having a filing date of Apr. 2, 2020, the entire contents both of which are hereby incorporated by reference.

FIELD OF TECHNOLOGY

The following relates to the field of wind turbine generator control, in particular to a method and a system for controlling operation of one or more wind turbines. The following further relates to a wind turbine and a computer program.

BACKGROUND

Known wind turbine controllers and monitoring systems rely on fixed thresholds for triggering warnings and alarms. More specifically, a warning is triggered when a monitored signal (such as a measured temperature, pressure, velocity, strain or other physical parameter value, or a fused and/or processed signal from several sensors) exceeds a pre-defined warning threshold. Similarly, an alarm is triggered when the monitored signal exceeds a pre-defined alarm threshold (which is usually higher than the warning threshold). As long as the monitored signal is below both thresholds, nothing is triggered.

This known approach relying on fixed thresholds has a number of drawbacks:
 The static thresholds are defined by domain experts. Thus, the thresholds are to some degree arbitrary.
 The thresholds are not defined in a data driven way, but rather hard coded from an existing specification.
 The conditions during testing of a component may differ from the conditions during actual operation.
 The thresholds do not reflect the complex physical reality.
 The quality of components may differ from zero-production or test to actual series production or behavior under production conditions.

A further drawback is that a single erroneous measurement value that exceeds the alarm threshold will trigger an alarm. This can lead to a turbine stop and hence cause a significant downtime and corresponding lost revenue. Furthermore, comparison of actual measurement values with the thresholds does not allow for detection of trends, such as a steadily increasing sensor signal value, which would make it possible to anticipate dangerous situations and to apply countermeasures in time to reduce the risk of triggering an alarm.

Hence, there may be a need for wind turbine monitoring methods and systems, which do not suffer from at least some of the above drawbacks.

SUMMARY

An aspect relates to a method of controlling operation of one or more wind turbines, the method comprising (a) receiving a parameter value which is based on at least one sensor signal, (b) determining a difference between the received parameter value and a predetermined value, (c) comparing the difference with a threshold value, and (d) if the difference is below the threshold value, (d1) operating the one or more wind turbines in a first mode of operation, (e) if the difference is not below the threshold value, (e1) incrementing an alert counter, (e2) comparing the alert counter with an alert threshold value, (e3) operating the one or more wind turbines in a second mode of operation if the alert counter is smaller than the alert threshold value or if the alert counter exceeds the second threshold value and the difference is decreasing, (e4) triggering an alarm if the alert counter exceeds the alert threshold value and the difference is not decreasing.

According to a first aspect, embodiments of the invention are based on the idea that the difference between the received parameter value and the predetermined value (i.e., the desired value of the parameter) is compared with a threshold value. As long as the difference is below the threshold value, the wind turbine is operated in a first mode of operation. However, when the difference is not below the threshold value, the alert counter is incremented and compared with an alert threshold value. If the alert counter is smaller than the alert threshold value, the wind turbine is operated in a second mode of operation. If the alert counter exceeds the alert threshold value and it is determined that the difference is decreasing, the wind turbine is also operated in the second mode of operation. In other words, the second mode of operation is applied as long as the alert counter has not incremented to a value exceeding the alert threshold value. Furthermore, the second mode of operation is applied even when the alert counter has been incremented beyond the alert threshold value, but the difference is decreasing, i.e., when it appears that operating the wind turbine in the second mode of operation relieves the problem. However, if the alert threshold value is reached and the difference is not decreasing, i.e., when operating the wind turbine in the second mode of operation does not appear to relieve the problem, then the alarm is triggered.

In short, the method applies a second mode of operation in an attempt to relieve the problem when the difference exceeds the threshold value and as long as the alert counter is not incremented beyond the alert threshold value. Once the alert counter is incremented beyond the alert threshold value, the second mode of operation is maintained only if the difference decreases. Otherwise, the alarm is triggered.

Thereby, the control scheme provided by this aspect of embodiments of the invention attempt to relieve the problem caused by the difference exceeding the threshold value by switching to a second mode of operation and maintaining this as long as the difference is determined to be decreasing. Only if the difference does not decrease, the alarm is triggered, which may cause the wind turbine to be stopped.

The parameter value may be a (digital or analog) value output directly from a sensor, such as a temperature sensor, a velocity sensor, a pressure sensor, a strain sensor, a velocity sensor, etc. Alternatively, the parameter value may be based on values output from a plurality of such sensors, in particular from a plurality of sensors of the same type and/or from a plurality of sensors of different types.

According to an embodiment of the invention, the method further comprises setting the alert counter to zero if the difference is below the threshold value.

In other words, as long as the difference is below the threshold value, the alert counter will be equal to zero. Furthermore, if the difference is reduced from being equal to or above the threshold value to being below the threshold value, the alert counter will be reset to zero.

According to a further embodiment of the invention, the alert counter is representative of a period of time during which the difference has not been below the threshold value.

In other words, the alert counter serves to measure a period of time that begins when the difference is no longer below the threshold value. As long as this period of time does not exceed the amount corresponding to the alert threshold value, the wind turbine is operated in the second mode of operation. When the period of time reaches or exceeds the alert threshold value, the second mode of operation is maintained only if the difference is decreasing; otherwise, the alarm is triggered.

According to a further embodiment of the invention, the first mode of operation is a normal mode of operation, and the second mode of operation is a modified mode of operation.

In the present context, the term "normal mode of operation" indicates the mode of operation which would be applied to the wind turbine without considering the potential problem(s) that may occur when the difference (between the parameter value and the predetermined value) increases beyond the threshold value.

In the present context, the term "modified mode of operation" indicates a mode of operation that is obtained by modifying the normal mode of operation, i.e., by modifying the wind turbine control scheme in comparison to normal operation.

According to a further embodiment of the invention, the modified mode of operation is configured to cause a reduction in the difference.

In other words, the modification in comparison to the normal mode of operation is done with the aim of causing a reduction in the difference, i.e., by adjusting certain aspects of the operation in order to remedy the problem indicated by the (too large) difference.

According to a further embodiment of the invention, the modified mode of operation is selected from a first modified mode of operation and a second modified mode of operation in dependency of the difference.

In other words, depending on how large the difference is, either a first or a second modified mode of operation is selected.

According to a further embodiment of the invention, the first modified mode of operation is selected when the difference is between the threshold value and a further threshold value, and the second modified mode of operation is selected when the difference exceeds the further threshold value.

In other words, when the difference exceeds the threshold value but is still below the further threshold value, the first modified mode of operation is selected. If the difference also exceeds the further threshold value, the second modified mode of operation is selected.

According to a further embodiment of the invention, the second modified mode of operation involves a more significant modification than the first modified mode of operation.

In other words, the second modified mode of operation involves more modification than the first modified mode of operation with the aim of addressing the problem corresponding to the elevated difference in a more aggressive manner than the first modified mode of operation.

According to a further embodiment of the invention, the first modified mode of operation does not involve a reduction of a power set point for the wind turbine, and the second modified mode of operation involves a reduction of the power set point for the wind turbine.

In other words, the first modified mode of operation aims at addressing the problem corresponding to the elevated difference in a "soft" manner while maintaining normal power production. The second modified mode of operation, on the other hand, involves a reduction of the wind turbine power production, which may allow a more rapid and efficient reduction of the elevated difference.

According to a further embodiment of the invention, the modified mode of operation is based on machine learning.

By applying machine learning to generate the modified mode of operation, including the first and second modified modes of operation, it will over time be possible to apply very effective modifications to the mode of operation by taking a large number of environmental and operational parameters into account.

According to a second aspect of embodiments of the invention, there is provided a system for controlling operation of one or more wind turbines, the system comprising (a) an interface configured to receive a parameter value which is based on at least one sensor signal, and (b) a processing unit configured to: (c) determine a difference between the received parameter value and a predetermined value, (d) compare the difference with a threshold value, and (e) if the difference is below the threshold value, (e1) operate the one or more wind turbines in a first mode of operation, (f) if the difference is not below the threshold value, (f1) increment an alert counter, (f2) compare the alert counter with an alert threshold value, (f3) operate the one or more wind turbines in a second mode of operation if the alert counter is smaller than the alert threshold value or if the alert counter exceeds the second threshold value and the difference is decreasing, (f4) trigger an alarm if the alert counter exceeds the alert threshold value and the difference is not decreasing.

This aspect of embodiments of the invention are essentially based on the same idea as the first aspect. More specifically, the second aspect implements the method of the first aspect in a control system for a wind turbine.

According to a third aspect of embodiments of the invention, there is provided a wind turbine comprising the system according to the second aspect.

In other words, the third aspect provides a wind turbine with the advantageous control system of the second aspect.

According to a fourth aspect of embodiments of the invention, there is provided a computer program comprising computer executable instructions, which, when executed by a processor of a computer, causes the computer to perform the method according to the first aspect or any of the above embodiments.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above, and further aspects of embodiments of the present invention are apparent from the examples of embodiments to be described hereinafter and are explained with reference to the examples of embodiments. The following will be described in more detail hereinafter with reference to examples of embodiments.

However, it is explicitly noted that embodiments of the invention are not limited to the described exemplary embodiments.

BRIEF DESCRIPTION

Some of the embodiments will be described in detail, with reference to the following figures, wherein like designations denote like members, wherein:

FIG. 1 shows a flowchart of a method according to an embodiment of the present invention;

FIG. 2 shows a plot of a parameter value as a function of time during application of a method according to an embodiment of the present invention;

FIG. 3 shows a plot of a parameter value as a function of time during application of a method according to a further embodiment of the present invention.

DETAILED DESCRIPTION

Figure 4:
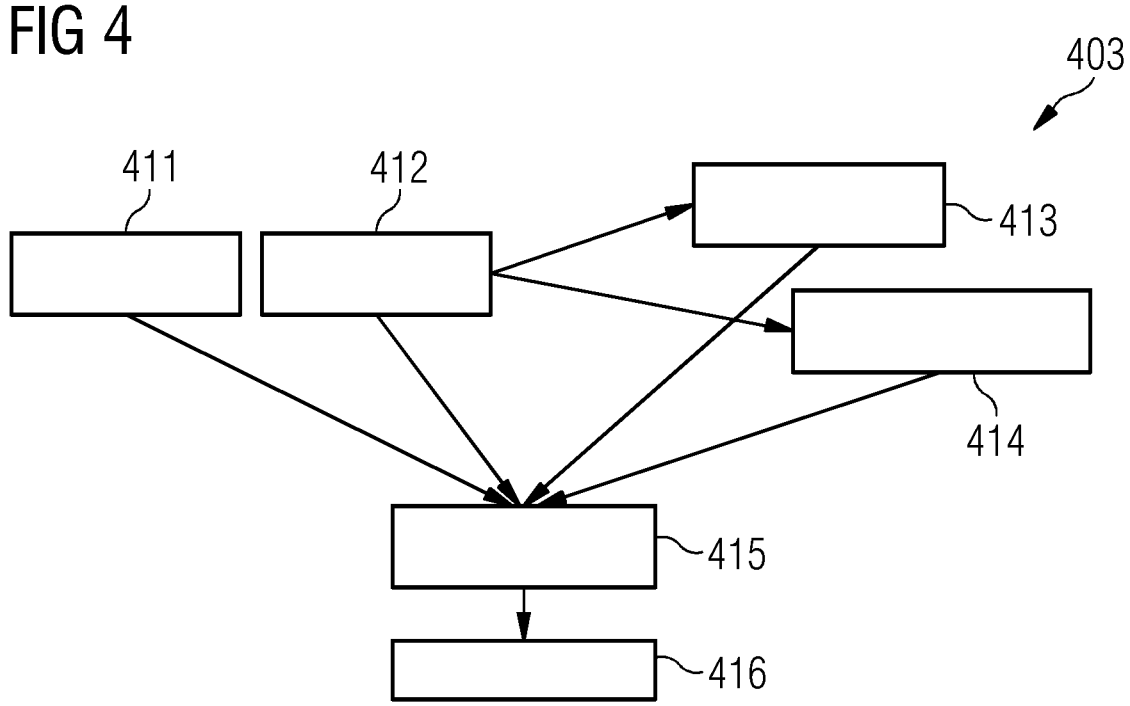
FIG. 4 shows a block diagram of a machine learning system used in embodiments of the present invention.

FIG. 1 shows a flowchart 100 of a method according to an embodiment of the present invention. The method begins with reading out a predetermined reference value $a_r$ of the parameter in question, such as a reference pressure value, a reference temperature value, or a reference fused value that is representative of several parameters. The reference value $a_r$ represents a valid or desired value of the parameter in question.

At 110, a parameter value a is received. The received parameter value a is an actual value, i.e., it is based on at least one sensor signal. At 120, the difference $\Delta a = a - a_r$ between the received parameter value a and the predetermined value $a_r$ is determined.

Then, at 130, the difference $\Delta a$ is compared with a threshold value $\Delta a_T$. If the difference is below the threshold value $\Delta a_T$, i.e., $\Delta a < \Delta a_T$, then the method continues to step 135, where an alert counter A is set to zero, i.e. A=0, and then to step 140, where the wind turbine's normal mode of operation is selected. Thereafter, the method returns to step 120 to recalculate the difference $\Delta a$ on the basis of a new received parameter value a.

On the other hand, if it is determined at 130 that the difference is not below the threshold value $\Delta a_T$, i.e., $\Delta a \geq \Delta a_T$, then, at 150, the alert counter A is incremented by 1, i.e. A=A+1. Then, at 160, the alert counter A is compared with an alert threshold value T. If the alert counter A does not exceed the alert threshold value T, i.e., if $A \leq T$, then the method continues to 170, where a modified mode of operation is selected for the wind turbine. The modified mode of operation is configured to cause a reduction in the difference. Thereafter, the method returns to step 120 to recalculate the difference $\Delta a$ on the basis of a new received parameter value a.

If it is determined at 160 that the alert counter A exceeds the alert threshold value T, i.e., if A>T, then it is determined at 180 whether the difference $\Delta a$ is decreasing or not. In other words, the most recent values of the difference, such as e.g., the last 10, 50, 100 or even more values of $\Delta a$ are analyzed to determine whether the difference $\Delta a$ has a decreasing trend. Such a decrease is symbolized as "$\Delta a \ll$" in the drawing. If it is determined that $\Delta a$ is decreasing, the method continues to 170 to operate the wind turbine in the modified mode of operation as described above. On the other hand, if the difference $\Delta a$ is not decreasing, the method continues to 190 where an alarm is triggered. Once this happens, the wind turbine will be shut down.

In other words, as soon as the difference $\Delta a$ is not below the threshold $\Delta a_T$, the modified mode of operation is applied and maintained at least until the alert counter A reaches the alert threshold value T, i.e., for a certain period of time corresponding to the alert threshold value T. Then, once the alert threshold value T is reached, the modified mode of operation is maintained only if the difference $\Delta a$ shows a decreasing trend, i.e., if it appears that the modified mode of operation is able to reduce the difference $\Delta a$. If this is not the case, the alarm is triggered.

It should be noted that several modifications of the method 100 are possible. For example, the reference value $a_r$ may be replaced by a reference range defined by a lower reference value and an upper reference value. Furthermore, the modified mode of operation may comprise a plurality of modified modes of operations where one of these is selected in dependency on the situation. For example, a moderate modification may be applied at first and if this is not successful, a more aggressive modification may be applied after a certain period or time and/or if the difference $\Delta a$ reaches a further threshold value.

FIG. 2 shows a plot 201 of a parameter value as a function of time during application of a method according to an embodiment of the present invention. More specifically, the parameter value in this example is the temperature difference between stator winding and magnet in a wind turbine generator. The plot 201 shows three threshold values: a first threshold value aa at 90° C., a second threshold value ab at 120° C., and a third threshold value at 130° C. Until t=t1, the curve a representing the measured parameter value is below the first threshold aa. During this period, the wind turbine is operated in accordance with a normal mode of operation 240. After t=t1, where the curve a crosses the first threshold aa, the operation of the wind turbine is switched to a modified mode of operation 270, which aims at reducing the temperature difference again. The modified mode of operation may e.g., involve an increase in fan speed in order to increase cooling of the stator winding. As can be seen, the temperature difference keeps increasing until t=t2, where it reaches the second threshold value ab. Then, two different scenarios are respectively depicted as curves a1 and a2. In the first scenario, corresponding to the curve a1, the temperature difference begins to decrease after t=t2. Hence, the modified mode of operation is maintained. In the second scenario, corresponding to the curve a2, the temperature difference keeps increasing towards the third threshold value ac. Therefore, due to the lack of a decreasing trend, the alarm 290 is triggered.

FIG. 3 shows a plot 302 of a parameter value as a function of time during application of a method according to a further embodiment of the present invention. Also in this example, the parameter value is the temperature difference between stator winding and magnet in a wind turbine generator as discussed above in conjunction with FIG. 2. Difference from the plot 201, plot 302 shows four (instead of three) threshold values: a first threshold value aa at 90° C., a second threshold value ab at 105° C., a third threshold value ac at 120° C., and a fourth threshold value ad at 130° C. Until t=t1, the curve a representing the measured parameter value is below the first threshold aa. During this period, the wind turbine is operated in accordance with a normal mode of operation 340. After t=t1, where the curve a crosses the first threshold aa, the operation of the wind turbine is switched to a first modified mode of operation 371, which aims at reducing the temperature difference again. The first modified mode of operation may e.g., involve an increase in fan speed in order to increase cooling of the stator winding. As can be seen, the temperature difference keeps increasing until t=t2, where it reaches the second threshold value ab. Therefore, the operation of the wind turbine is switched to a second modified mode of operation 372, which additionally involves a reduction of the power set point value for the wind turbine in order to apply a more aggressive measure for reducing the temperature difference. The curve a reaches the third threshold value ac at t=t3. Then, two different scenarios are respectively depicted as curves a1 and a2. In the first scenario, corresponding to the curve a1, the temperature difference begins to decrease after t=t3. Hence, the modified mode of operation is maintained. In the second scenario, corresponding to the curve a2, the temperature difference keeps increasing towards the fourth threshold value ad. Therefore, due to the lack of a decreasing trend, the alarm 390 is triggered.

It is noted that the specific parameter values and threshold values discussed in conjunction with FIGS. 2 and 3 are exemplary values only and that the corresponding values may differ from one wind turbine implementation to another.

FIG. 4 shows a block diagram 403 of a machine learning system used in embodiments of the present invention. The block 411 comprises desired curve paths for a parameter while the block 412 comprises undesired curve paths for the parameter. The desired and undesired curve paths in block 412 are based on data obtained during operation and/or simulation. In particular, the desired curve paths for a parameter can be obtained from calculations, simulations and historical data, which can provide information on how the parameter will vary in time under different load conditions. The undesired curve paths can be obtained from various simulations carried out with undesired scenarios induced into baseline simulations as well as from previous SCADA data corresponding to undesired circumstances.

The block 413 comprises desired curve paths for the parameter after application of a modified control strategy while the block 414 comprises undesired curve paths for the parameter after applying the modified control strategy. The application of a modified control strategy is represented by the arrows connecting block 412 with blocks 413 and 414, respectively. By inducing the undesired scenarios into baseline calculations (simulations) or the undesired data from the SCADA system, when it has already tried to change some control parameter until the control limit in order to bring it back to normal operation, the system will know which control parameter it has to change as well as the amount of change that should be applied. This data is provided as a modified control strategy, and it is checked in calculations/simulations whether they lead to a normal operational curve. In this way, the data in blocks 413 and 414 can be obtained.

All these data, i.e., the data from blocks 411, 412, 413, 414, are pushed into the wind turbine controller for Edge computing, and the algorithm can run on the edge device as well as in the cloud (taking data from several wind turbines into account) in a case where parallel alarms are occurring in several wind turbines at a time in a wind farm.

Block 415 contains the actual machine learning model, in particular a recurrent neural network to take its own decisions as to how much (e.g., in percentages) one or more control parameters can be changed in order to get one parameter to follow a desired curve path. The decision is output in block 416. Using reinforcement learning can also be used to make a wind turbine learn from its own past and to get better in further decision making, thereby leading to quicker control strategy when the problem starts to occur.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling operation of one or more wind turbines, the method comprising receiving a parameter value which is based on at least one sensor signal, determining a difference between the received parameter value and a predetermined value, comparing the difference with a threshold value, and if the difference is below the threshold value, operating the one or more wind turbines in a first mode of operation, if the difference is not below the threshold value, incrementing an alert counter, comparing the alert counter with an alert threshold value, operating the one or more wind turbines in a second mode of operation if the alert counter is smaller than the alert threshold value or if the alert counter exceeds the alert threshold value and the difference is decreasing, triggering an alarm if the alert counter exceeds the alert threshold value and the difference is not decreasing; wherein the first mode of operation is a normal mode of operation and the second mode of operation is a modified mode of operation and the second mode of operation a modified mode of operation; and wherein the modified mode of operation is selected from a first modified mode of operation and a second modified mode of operation in dependency of the difference.

2. The method according to claim 1, further comprising setting the alert counter to zero if the difference is below the threshold value.

3. The method according to claim 1, wherein the alert counter is representative of a period of time during which the difference has not been below the threshold value.

4. The method according to claim 1, wherein the modified mode of operation is configured to cause a reduction in the difference.

5. The method according claim 1, wherein the first modified mode of operation is selected when the difference is between the threshold value and a further threshold value, and wherein the second modified mode of operation is selected when the difference exceeds the further threshold value.

6. The method according to claim 1, wherein the second modified mode of operation involves a more significant modification than the first modified mode of operation.

7. The method according to claim 1, wherein the first modified mode of operation does not involve a reduction of a power set point for the wind turbine, and wherein the second modified mode of operation involves a reduction of the power set point for the wind turbine.

8. The method according to claim 1, wherein the modified mode of operation is based on machine learning.

9. A computer program comprising computer executable instructions, which, when executed by a processor of a computer, causes the computer to perform the method according to claim 1.

10. A system for controlling operation of one or more wind turbines, the system comprising: an interface configured to receive a parameter value which is based on at least one sensor signal, and a processing unit configured to: determine a difference between the received parameter value and a predetermined value, compare the difference with a threshold value, and if the difference is below the threshold value, operate the one or more wind turbines in a first mode of operation, if the difference is not below the threshold value, increment an alert counter, compare the alert counter with an alert threshold value, operate the one or more wind turbines in a second mode of operation if the alert counter is smaller than the alert threshold value or if the alert counter exceeds the second threshold value and the difference is decreasing, trigger an alarm if the alert counter exceeds the alert threshold value and the difference is not decreasing; wherein the first mode of operation is a normal mode of operation and the second mode of operation is a modified mode of operation and the second mode of operation a modified mode of operation; and wherein the modified mode of operation is selected from a first modified mode of operation and a second modified mode of operation in dependency of the difference.

11. A wind turbine comprising the system according to claim 10.

* * * * *